United States Patent [19]

Ince et al.

[11] Patent Number: 5,658,363

[45] Date of Patent: Aug. 19, 1997

[54] METHOD OF JOINING A TUBE TO A ROD HAVING AN ANNULAR RIB, SO AS TO FORM AN OPTICAL FIBER PREFORM

[75] Inventors: Peter Robert Ince, Brentwood; Graham Frederick Wood, Saffron Walden; Peter Charles Sampson, Bishops Stortford, all of England

[73] Assignee: Pirelli General PLC, London, England

[21] Appl. No.: 500,442

[22] Filed: Jul. 10, 1995

[30] Foreign Application Priority Data

Jul. 21, 1994 [GB] United Kingdom ............... 9414751

[51] Int. Cl.⁶ .................................. C03B 37/012
[52] U.S. Cl. ........................ 65/412; 65/428; 65/55
[58] Field of Search .................. 65/412, 428, 55, 65/427, 279, 280

[56] References Cited

U.S. PATENT DOCUMENTS

| | | | |
|---|---|---|---|
| 2,475,431 | 7/1949 | Luertzing | 65/55 |
| 4,793,842 | 12/1988 | Yokota | 65/412 |
| 4,812,154 | 3/1989 | Yoshida | |
| 4,820,322 | 4/1989 | Baumgart | 65/412 |

FOREIGN PATENT DOCUMENTS

| | | | |
|---|---|---|---|
| 244135A1 | 4/1987 | European Pat. Off. | |
| 443135A1 | 12/1990 | European Pat. Off. | |
| 54-13351 | 1/1979 | Japan | 65/412 |
| 59-15090 | 4/1984 | Japan | 65/412 |
| 60-108334 | 6/1985 | Japan | 65/412 |
| 925335 | 5/1963 | United Kingdom. | |
| 2176472 | 3/1986 | United Kingdom. | |

OTHER PUBLICATIONS

Patent Abstracts of Japan vol. 5, No. 28 (C-44) (700) Feb. 20, 1981.

*Primary Examiner*—John Hoffman
*Attorney, Agent, or Firm*—Brooks Haidt Haffner & Delahunty

[57] ABSTRACT

A method of manufacturing a preform for drawing into an optical fibre comprises positioning a rod within a sleeving tube therefor to form an assembly in which there is an annular space between the rod and tube, and collapsing the tube onto the rod to form a solid cross-section preform. The collapsing step comprises sealingly closing the annular space at one end of the assembly and applying suction to the annular space from the other end of the assembly. The annular space at the one end is sealingly closed by locating the end of the tube at the one end on an annular rib of the rod and fusing the tube end to the rib.

7 Claims, 1 Drawing Sheet

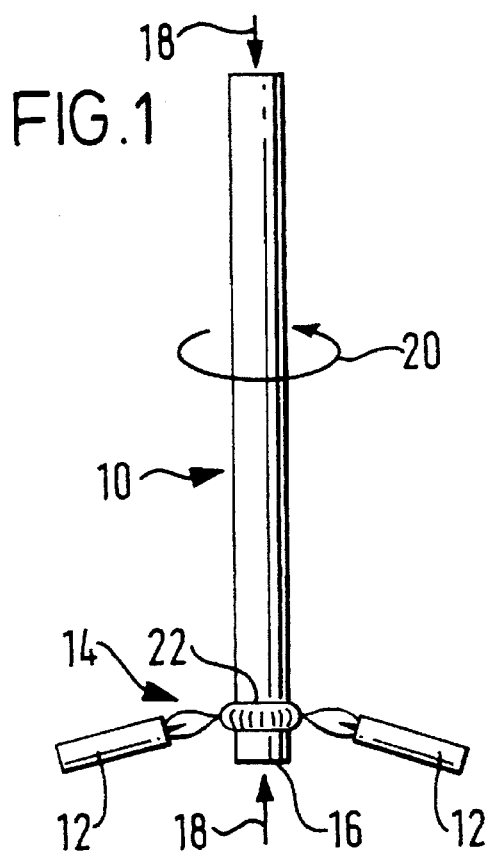
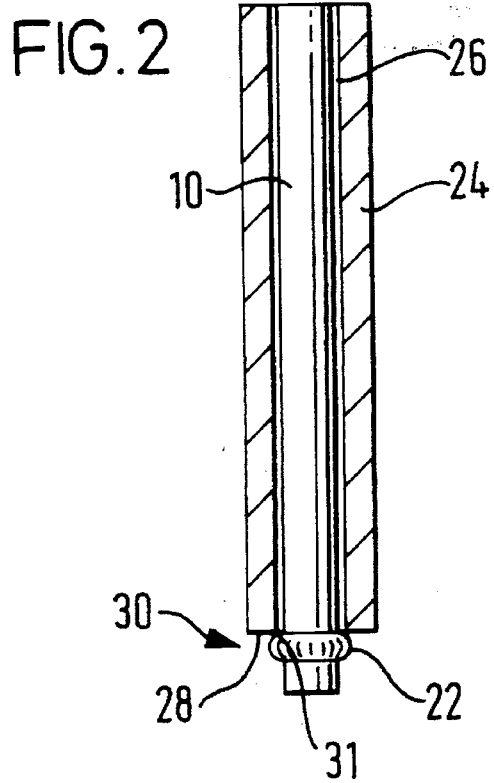
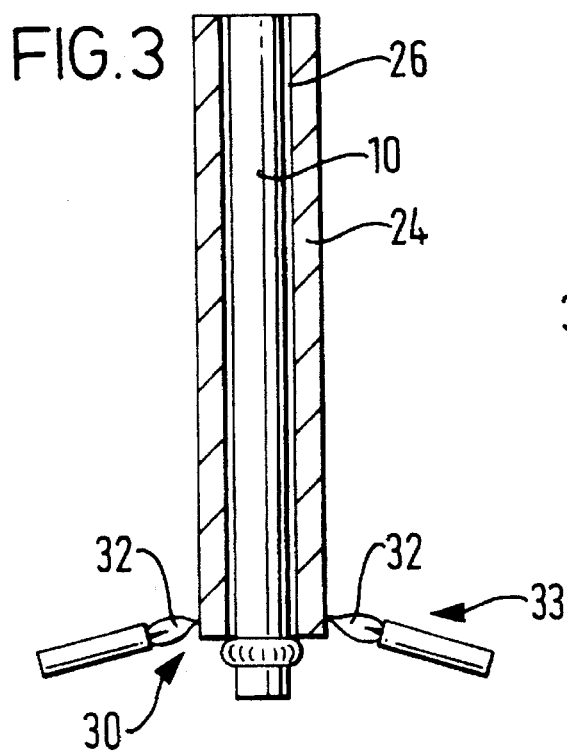
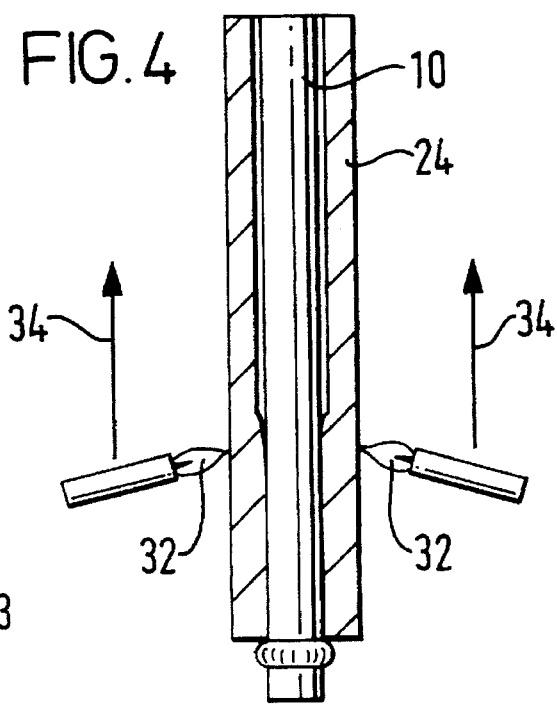

METHOD OF JOINING A TUBE TO A ROD HAVING AN ANNULAR RIB, SO AS TO FORM AN OPTICAL FIBER PREFORM

This invention relates to a method of manufacturing a preform for drawing into an optical fibre.

BACKGROUND OF THE INVENTION

It is known to manufacture such a preform by positioning a rod within a sleeving tube therefor to form an assembly in which there is an annular space between the rod and tube and collapsing the tube onto the rod to form a solid cross-section tube. Such a method is sometimes referred to as the 'rod-in-tube' method and methods falling into this category are disclosed for example in GB2109367A and GB2043619A.

The collapsing step in the rod-in-tube method typically comprises sealingly closing the annular space between the rod and tube at one end of the assembly and applying suction to the annular space from the other end of the assembly. Typically the collapsing step also includes thermally softening the tube for example using a heat source which traverses the assembly from said one end to the other end and also the sealing of the annular space at said one end of the assembly has been achieved by a sealing device comprising elastomeric 'O'-rings sealing against surfaces of the rod and tube at axially spaced locations. Such an arrangement is disadvantageous in that not only is the axial length of the assembly over which the sealing device extends not collapsed thus shortening the length of the preform, but also because when a heat source is used there is a danger that the material of the 'O'-rings will degrade and that degradation products will be sucked along the annular space between the rod and tube during the collapsing step to contaminate the interface therebetween. Such contamination can result in flaws at the interface which give rise to breaks in the fibre drawn from the preform during tensile testing. In an attempt to avoid this latter problem the traverse of the heat source may be started at a predetermined distance from the 'O'-rings, but this further shortens the resulting preform.

SUMMARY OF THE INVENTION

In order to avoid the above-mentioned problem, in broad terms the method of the present invention seals the material of the rod and tube together at said one end.

More specifically, the invention includes a method of manufacturing a preform for drawing into an optical fibre comprising positioning a rod within a sleeving tube therefor to form an assembly in which there is an annular space between the rod and tube, and collapsing the tube onto the rod to form a solid cross-section preform, said collapsing step comprising sealingly closing said annular space at one end of said assembly and applying suction to the annular space from the other end of said assembly, wherein said annular space at said one end is sealingly closed by locating the end of the tube at said one end on an annular rib of said rod and fusing said tube end to said rib.

The invention also includes a preform when manufactured by the method defined in the last preceding paragraph and an optical fibre drawn from such a preform.

In the method, preferably said tube end is located on said rib with the radially inner edge of said tube end engaging said rib.

The fusing step may comprise initially heating said tube at a position which is axially inwardly of said rib from said one end of the assembly and thereafter heating said tube at a position which is axially aligned with said rib.

The method may include forming said annular rib of said rod by heating said rod at a predetermined axial position therealong and axially compressing said rod, and preferably said rod is rotated about its central axis during said step of forming said annular rib thereof.

BRIEF DESCRIPTION OF THE DRAWINGS

In order that the invention may be well understood, an embodiment thereof which is given by way of example only, will now be described with reference to the accompanying drawings, in which:

FIG. 1 schematically illustrates the step of forming a rod with an annular rib;

FIG. 2 schematically illustrates the positioning of the rod within a sleeving tube therefor to form an assembly;

DESCRIPTION OF THE PREFERRED EMBODIMENTS

FIG. 3 schematically illustrates the step of fusing an end of the tube to the rib; and FIG. 4 schematically illustrates the step of collapsing the tube onto the rod.

In its simplest form the rod used in the embodiment is a silica rod doped with a refractive index raising dopant and the sleeving tube is formed of substantially pure silica whereby when the preform is drawn into an optical fibre the rod forms the optical fibre core and the tube forms the cladding. However it is to be understood that the rod and/or the tube may have layers with different dopants or dopant concentrations and that accordingly a radially outer annular portion of the rod may form part of the cladding and a radially inner annular portion of the tube may form part of the core. The rod may be made using an inside vapour deposition technique such as the modified chemical vapour deposition technique or an outside vapour deposition technique.

Referring now to the drawings, as shown in FIG. 1, the rod, which is designated 10 in the Figures, is monolithic and heated by flames 12 or another suitable heat source at a predetermined axial position 14 therealong adjacent, but spaced from, one end 16 thereof, whilst being axially compressed and rotated about its axis as indicated by arrows 18 and 20 respectively in order to form an annular rib, or protuberance, 22 on the rod. The rod 10 is then positioned within the sleeving tube 24 to form an assembly as illustrated in FIG. 2 in which there is an annular space 26 (shown enlarged for the sake of clarity) between the rod and tube and an end 28 of the tube locates on the rib 22 at one end 30 of the assembly. As shown, the tube end 28 is located on the rib 22 with the radially inner edge 31 of the tube end 28 engaging the rib 22. The end 16 of the rod is clamped in the bottom chuck of a vertical lathe (not shown) and the relative positions of the rod and tube are adjusted and clamped at the other end of the assembly by a known device (not shown) associated with the upper chuck of the lathe in order to locate the rod concentrically with the tube.

Then as shown in FIG. 3 the tube end 28 is fused to the rib 22 to seal the annular space 26 at the end 30 of the assembly. The fusing step comprises initially heating the tube with flames 32 or another suitable heat source at a position 33 which is axially inward of the rib 22 from the end 30 of the assembly and thereafter at a position which is axially aligned with the rib, both heating steps being carried out whilst the assembly is rotated in the lathe. Typically the flames 32 initially heat the tube about 1 cm above the tube end 28 for about 60 seconds after which the flames are moved downwardly into axial alignment with the interface between the tube end and the rib for about 60 seconds, suction being applied for about the last 30 seconds of this period to the annular space 26 from the top end of the assembly via the clamping device which also seals the annular space and provides a suitable connection to a suction device. In this way the rod and sleeve are sealed together at the end 30 thereof and suction is applied to the annular space.

Thereafter, as schematically shown in FIG. 4 by arrows 34, the flames 32 are traversed upwardly along the assembly from the initial heating position axially inward of the rib referred to above to collapse the tube onto the rod in the normal manner to form a solid cross-section preform.

From the foregoing it will be appreciated that the described method of sealing the annular space between the tube and rod at the end of the assembly remote from the end to which suction is applied results in a longer usable preform from an assembly of a given length than is achievable using the prior sealing device discussed above and furthermore eliminates the risk of contamination at the rod-tube interface due to degradation of the 'O'-rings of such a device.

We claim:

1. A method of manufacturing a preform for drawing into an optical fibre comprising providing a rod for forming at least a core portion of the optical fibre to be drawn from the preform, said rod extending between opposite ends thereof and having a solid cross-section; providing a sleeving tube for the rod for forming at least a cladding portion of the optical fibre to be drawn from the preform, said tube having a length between opposite ends thereof which is substantially the same as the length of the rod between the opposite ends of the rod; positioning said rod within said sleeving tube therefor to form an assembly in which the rod and tube extend coextensively between opposite ends of the assembly with an annular space between the rod and tube and with one end of the tube and one end of the rod being disposed at one end of the assembly; and collapsing the tube onto the rod to form a solid cross-section preform, said collapsing step comprising sealingly closing said annular space at said one end of said assembly and applying suction to the annular space from the other end of said assembly, wherein said annular space at said one end is sealingly closed by locating said one end of the tube at said one end of the assembly on an annular rib of said rod and fusing said tube end to said rib.

2. A method as claimed in claim 1, wherein said one end of said tube has a radially inner edge which is engaged with said rib.

3. A method as claimed in claim 1, wherein said fusing step comprises heating said tube at a position which is axially inward of said rib from said one end of the assembly and thereafter heating said tube at a position which is axially aligned with said rib.

4. A method as claimed in claim 1, including forming said annular rib of said rod by heating said rod at a predetermined axial position therealong and axially compressing said rod.

5. A method as claimed in claim 4, wherein said rod is rotated about its central axis during said step of forming said annular rib thereof.

6. A method as claimed in claim 1, wherein said rod is monolithic.

7. A method as claimed in claim 1 wherein said rod is a glass rod and said tube is a glass tube, the glass of said rod having a refraction index different from the refraction index of said tube.

* * * * *

UNITED STATES PATENT AND TRADEMARK OFFICE
CERTIFICATE OF CORRECTION

PATENT NO.  : 5,658,363
DATED       : August 19, 1997
INVENTOR(S) : Ince et al

It is certified that error appears in the above-indentified patent and that said Letters Patent is hereby corrected as shown below:

Col. 1, line 65, change "inwardly" to --inward--;

Col. 2, lines 18 and 19, "DESCRIPTION OF THE PREFERRED EMBODIMENTS" should be inserted before line 25.

Signed and Sealed this

Eleventh Day of November, 1997

Attest:

BRUCE LEHMAN

Attesting Officer

Commissioner of Patents and Trademarks